United States Patent
Young et al.

(10) Patent No.: US 7,160,972 B2
(45) Date of Patent: Jan. 9, 2007

(54) OPTICALLY CLEAR HIGH TEMPERATURE RESISTANT SILICONE POLYMERS OF HIGH REFRACTIVE INDEX

(75) Inventors: Nickelous David Young, Piru, CA (US); David Stevenson Stone, deceased, late of Marion, MA (US); by David B. Stone, legal representative, Marion, MA (US); Robert Vincent Thomaier, Ventura, CA (US); Keith Bryan Reichel, Santa Barbara, CA (US)

(73) Assignee: NuSil Technology LLC, Carpinteria, CA (US)

( * ) Notice: Subject to any disclaimer, the term of this patent is extended or adjusted under 35 U.S.C. 154(b) by 149 days.

(21) Appl. No.: 10/779,177

(22) Filed: Feb. 12, 2004

(65) Prior Publication Data

US 2004/0198924 A1 Oct. 7, 2004

Related U.S. Application Data

(60) Provisional application No. 60/448,394, filed on Feb. 19, 2003.

(51) Int. Cl.
*C08G 77/12* (2006.01)
(52) U.S. Cl. .................... 528/31; 528/32; 528/43
(58) Field of Classification Search ............. 528/32, 528/31, 43
See application file for complete search history.

(56) References Cited

U.S. PATENT DOCUMENTS

| | | | |
|---|---|---|---|
| 4,152,509 A | 5/1979 | Hayashi et al. | |
| 5,204,435 A | 4/1993 | Abe et al. | |
| 5,217,811 A | 6/1993 | Filas et al. | |
| 5,850,498 A | 12/1998 | Shacklette et al. | |
| 6,204,523 B1 | 3/2001 | Carey et al. | |
| 6,247,924 B1 | 6/2001 | Gunnarsson | |
| 6,415,093 B1 | 7/2002 | Nakamura et al. | |
| 6,417,019 B1 | 7/2002 | Mueller et al. | |
| 6,432,137 B1 | 8/2002 | Alexeeva et al. | |
| 6,815,520 B1 * | 11/2004 | Yoneda et al. | 528/31 |
| 2002/0177660 A1 | 11/2002 | Imoto et al. | |

FOREIGN PATENT DOCUMENTS

EP 0 709 434 A 5/1996

OTHER PUBLICATIONS

Usui, et al: "Deuterated polysiloxane optical waveguides with low loss and high environmental stability" Electronic Manufacturing Technology Symposium, 1995 Japan International, 18th IEEE/CPMT International Omiya, Japan Dec. 4-6, 1995, New York, NY, USA, IEEE, US, Dec. 4, 1995, pp. 260-263, XP010195596 ISBN: 0-7803-3622-4.

Eldada, et al., Advances in Polymer Integrated Optics, EEE Journal of Selected Topics in Quantum Electronics, Jan./Feb. 2000, 54-68, vol. 6, No. 1.

Encyclopedia of Chemical Technology fourth Edition, 225-226, vol. 15, John Wiley & Sons Publishers.

* cited by examiner

*Primary Examiner*—Kuo-Liang Peng
(74) *Attorney, Agent, or Firm*—Gabor L. Szekeres

(57) ABSTRACT

A thermally stable polysiloxane composition is a cross-linked product of a Part A composition, of a Part B composition and a catalyst, the Part A composition being a polysiloxane having 60 to 75 percent by weight phenyl groups, the Part B composition being a polysiloxane having 50 to 80 percent by weight phenyl groups. The composition has the properties of optical clarity as measured by 90% or greater transmission of light of 400 nm wavelength in a 1.0 centimeter path, a refractive index at 589 nm of 1.545 or greater and still has 90% or greater transmission of light of 400 nm wavelength in a 1.0 centimeter path after exposure to 150° C. for 6 hours. The composition is well suited for application as an optically transmissive cover or lens for light emitting diodes and for use in other optical and related devices.

4 Claims, 8 Drawing Sheets

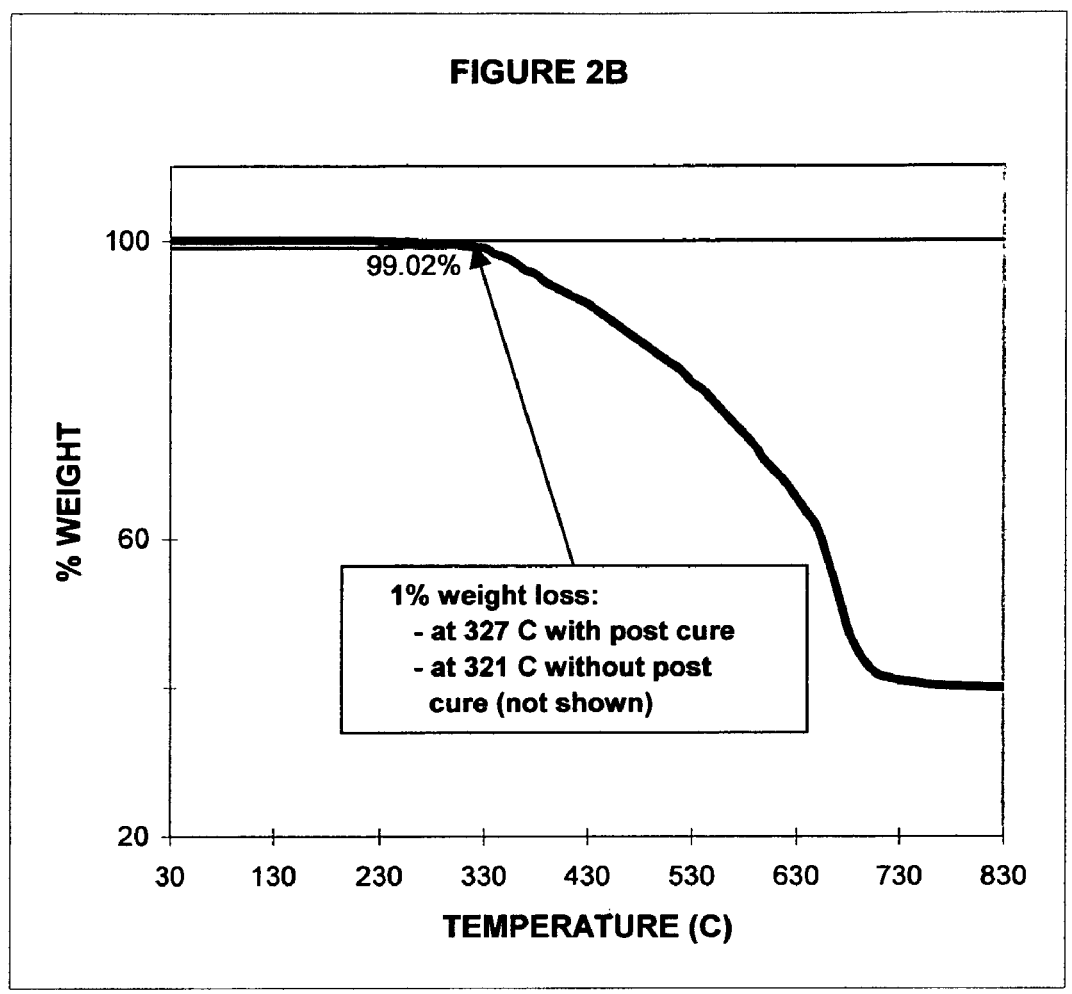

OPTICALLY CLEAR HIGH TEMPERATURE RESISTANT SILICONE POLYMERS OF HIGH REFRACTIVE INDEX

REFERENCE TO PRIORITY APPLICATION

The present application claims the priority of United States provisional application Ser. No. 60/448,394 filed on Feb. 19, 2003.

BACKGROUND OF THE INVENTION

1. Field of the Invention

The present invention is in the field of silicone polymers. More particularly the present invention relates to optically clear, high temperature resistant silicone polymers which have a high refractive index. The present invention also relates to the process of making such polymers. Further, the present invention relates to the application of the polymers of the invention to the fields of optical waveguides, high brightness light emitting diodes (HBLEDs), photovoltaic devices, vertical cavity surface emitting lasers (VCSELs), laser diodes, light sensing devices, flat panel displays, projection display optics components, and injection-moldable optical lenses and other optical parts, devices and structures.

2. Brief Description of Background Art

Silicone polymers per se are well known in the art. U.S. Pat. No. 5,217,811 discloses a vinyl-terminated dimethyl-diphenylsiloxane copolymer crosslinked with tri- or tetrafunctional silanes. The optical refractive index ($n_D$) of this crosslinked silicone copolymer can be adjusted by varying the phenyl group content of the copolymer. The highest optical refractive index disclosed in this reference appears to be 1.50. The cross-linked silicone copolymers of this reference are used as index matching materials for connections between optical components, such as optical fibers.

A persistent difficulty in the field of optical polymer materials is the high attenuation of such materials in the near ultraviolet (UV), visible, and near-infrared (NIR) portions of the electromagnetic spectrum.

Optical clarity is expressed as the percentage of light transmission over a one-centimeter path length at the wavelength of interest. Equivalently, the complementary property of optical absorption is expressed as decibels of light signal loss per centimeter of optical path length (dB/cm). For adequate optical clarity in the field of optical waveguides used in the NIR, optical polymers should preferably exhibit absorption of less than 0.2 dB/cm. (See Advances in Polymer Integrated Optics, EEE Journal of Selected Topics in Quantum Electronics, Volume 6 No. 1, 2000 by Eldada et al.). In the field of molded plastic optical lenses, the lens thickness is typically in the range of 1 to 5 millimeters. For visible light applications such as white light emitting diode (LED) lenses, camera lenses, or implantable intraoccular lenses, it is desirable to maintain optical transmission over the visible range which is sufficient to prevent any detection of haze or color tint by the human eye. This degree of visually perceived clarity is often denoted "crystal clear", or equivalently "water white". For such devices, an optical polymer exhibiting water white clarity should exhibit absorption less than 0.2 dB/cm or equivalently should have a transmission of greater than 90%, preferably greater than 95%, in one centimeter across the visible range of wavelengths, and in particular at the short wavelength end of the visible spectrum.

In the fields of HBLEDs, photovoltaic cells, VCSELs, high efficiency photosensors, and flat panel displays, optical polymers may be used to form an encapsulating layer between the light emitting or light sensing element itself and an outer lens or cover glass, or may serve as both encapsulant and outer lens simultaneously. The degree of desired optical transmission in these applications again is typically greater than 90%, preferably greater than 95% over a one centimeter path at the wavelength of interest.

A further difficulty in the field of optical polymers is the requirement for such materials to withstand high temperatures without degradation in mechanical or optical properties. There are two high temperature conditions that are commonly encountered: steady state high temperature service, and transient high temperature service. Steady state high temperature service represents the maximum temperature to which the optical device is subjected for long continuous periods, of the order of hours up to many thousand of hours. Examples of steady state high temperature service range from approximately 30° C. to 40° C. for laboratory instrument optics and intraoccular implants, to 85° C. for telecommunications fiber optic control components, to 140° C. for automotive and aerospace optics. Transient high temperature service limits are usually due to exposure of the device to processing temperatures at later steps of manufacture with exposure times of the order of minutes. Commonly encountered high temperature processes range from lead alloy soldering (150° C. to 200° C.) to lead-free soldering (200° C. to 260° C.).

When exposed to high temperature service conditions, many optical polymers will degrade in performance. Mechanical degradation takes the form of hardening, outgassing of volatiles, embrittlement, crazing, cracking, shrinking, melting, or delamination of the polymer from substrates. Optical performance degradation can take the form of increases in optical absorption noticeable visually as a transition from water white to yellow or brown color tint, or a development of milkiness or haze. Quantitatively, this type of degradation usually is more extreme at the short wavelength end of the visible spectrum at 400 nm than at the long wavelength end of the spectrum at 750 nm. Yellowing typically becomes visually noticeable when the transmission at 400 nm falls below 90% and is usually considered unacceptable when it falls below 80% at 400 nm. It is typically the case for optical polymers that temperature-induced increases in absorption occur first at the shortest wavelengths (e.g. 400 nm) and are not apparent at the longer visible or NIR wavelengths (e.g. 1300 nm, 1550 nm) until much more severe exposure has occurred. For this reason, acceptable optical transmission degradation of an optical polymer at 400 nm induced by high temperature service is normally a strong indicator that any such degradation will be either undetectable or certainly acceptable at longer visible and NIR wavelengths. In addition, some of the mechanical degradation symptoms listed above such as crazing or delamination can also create large optical signal reflection or absorption.

Yet another difficulty in application of polymers to many optical and related devices is the need for polymers to also have, in addition to optical clarity and high temperature service, the advantageous property of high refractive index. In the context of the present description, "high refractive index" is taken to mean an index of refraction greater than or equal to 1.545 at 589 nm. High refractive index is advantageous in many optics designs for improving the light transmission efficiency of the design, or for reducing the required size of the optical assembly. For example, in the field of HBLEDs, the light extraction efficiency of the LED die is increased when high refractive index die encapsulants are employed. Specifically, the publication ENCYCLOPEDIA OF CHEMICAL TECHNOLOGY fourth Edition, Volume 15 pp 225–226 (John Wiley & Sons Publishers) discloses certain operational characteristics of light emitting diodes and teaches that epoxy, utilized for encapsulation of the light-emitting diode, typically has an optical refractive index of approximately 1.6. The equation disclosed in this reference provides the mathematical explanation for the requirement mentioned above that for a light-emitting diode to function efficiently the refractive index of its encapsulating coating must be high, preferably over 1.545 even more preferably over 1.56.

In the field of intraoccular lenses, use of a high refractive index polymer for the lens material permits the same focusing power with a lens which is smaller in physical size.

In the field of planar optical waveguides, a high refractive index waveguide core improves the waveguide bend leakage, and permits shorter waveguide runs for phase delay elements.

Another persistent difficulty in the field of optical polymers is the capability of the polymer to withstand exposure to radiation of high intensity. Many of the devices employing optical polymers require such radiation exposure for extended periods of time. For example, polymers used in the construction of projection optics, HBLEDs, and VCSELs are routinely exposed to non-ionizing radiation which may cause localized heating of the polymer, thereby enhancing its degradation through the temperature service effects described above. Exposure to ionizing radiation also occurs in some devices. For example, flat panel displays used in outdoor applications and automotive taillight LEDs are exposed to the UV radiation of sunlight; HBLED dies operating below 400 nm emission wavelength transmit near UV radiation which passes through optical polymer encapsulants and lenses. The presence of intense ionizing radiation is known from the prior art to degrade many types of optical polymers. However, it is known from the prior art of polymers used in lubrication and plastic compositions for the nuclear industry that highly phenylated polymers exhibit improved resistance to radiation damage.

Still another persistent difficulty in the field of optical polymers is the need for materials that can be varied in elastic modulus across a range from very soft gel materials to hard plastic materials. Such variation in elastic properties is often desirable in certain optical devices for the purpose of reducing internal stresses during temperature cycling, and for matching dimensional shifts due to expansion and contraction of adjacent materials with different coefficients of thermal expansion. While some of the aforementioned polymer technologies of the prior art, notably some of the silicones, are capable of wide variations in elastic modulus, most are available only with the modulus values of hard plastics, measuring on the Shore D durometer scale of hardness of ASTM D-2240.

It is instructive to summarize the shortcomings of optical polymers heretofore employed in several optical and related devices where the silicone composition of the present invention can be advantageously employed. Thus, prior art polymers generally exhibit one or two of the desirable properties of optical clarity, high temperature service, and high refractive index, but do not exhibit all three properties simultaneously. For example, prior art polymers which may have adequate optical clarity and high temperature service but inadequately high refractive index include fluorosilicones, dimethyl silicones, some phenylmethyl silicones and amorphous perfluoropolymers, amorphous fluoroplastics, and other amorphous halogenated plastics. See for example U.S. Pat. No. 6,204,523 that discloses light-emitting diodes encapsulated with silicone compositions that are transparent in the green-to-near UV wavelength range, approximately 570 to 350 nm.

A second class of prior art polymers has adequately high refractive index and high temperature service capability but inadequate optical clarity; such polymers may include: polyetherimides, and polyimides.

A third class of prior art polymers has adequate optical clarity, and some of which have adequately high refractive index but which are incapable of high temperature service. These include optically clear epoxides, polymethylmethacrylates, acrylics, polyvinylchlorides, cyclic olefin copolymers, polyurethanes, cellulose acetate butyrates, polycarbonates, and polystyrenes. In contrast to all of the foregoing types of conventional polymers used for optical device applications, the phenyl silicone resin compositions of the present invention, when applied to the optical devices described above, simultaneously exhibit the requisite properties of optical clarity, high temperature service and high refractive index.

It is well known in the art that silicone polymers are generally speaking more resistant to heat than other polymers. Nevertheless, as far as the present inventors are aware, optically clear crosslinkable liquid silicone polymers have not been made to this date with an optical refractive index greater than 1.54. This is in spite of the fact that U.S. Pat. No. 6,204,523 states that silicone has a high refractive index (1.4 through 1.7). However, this reference patent does not disclose any specific silicone composition and provides no basis for the assertion that a silicone composition of such high refractive index has ever been made.

In light of the foregoing, there is a need in the art for a silicone composition which has an optical refractive index in the range of 1.545 to 1.60, has high thermal stability and resistance to aging (yellowing) and is transparent to light down to the wavelength of 400 nm. In addition there is a need in the prior art for compositions which have the above-noted properties and additionally have the improved capability of withstanding radiation of high intensity and the capability of being formulated with an elastic modulus that ranges from very soft materials to hard plastics. The present invention provides such compositions.

SUMMARY OF THE INVENTION

In accordance with the present invention a polysiloxane composition is provided which has the following advantageous properties:
(1) optical clarity of 90% or greater transmission of light of 400 nm wavelength in a 1.0 centimeter path;
(2) thermal stability in that the composition still has 90% or greater transmission of light of 400 nm wavelength in a 1.0 centimeter path after exposure to 150° C. for 6 hours, and
(3) high refractive index manifested in an index of refraction at 589 nm of 1.545 or greater.

A silicone composition having the above-described properties is a blend of two high phenyl containing polysiloxanes that are cross-linked by a high refractive index catalyst to a desired extent by linkage of vinyl groups to silicon hydrides.

The silicone compositions of the present invention are advantageously utilized in optical waveguides, high brightness light emitting diodes (HBLEDs), photovoltaic devices, vertical cavity surface emitting lasers (VCSELs), laser diodes, light sensing devices, flat panel displays, projection display optics components, and injection-moldable optical lenses and other optical parts, devices and structures and further in devices employing bulk encapsulation, devices employing the silicone polymer of the invention as a passive supporting matrix for photonically active elements, and discrete parts individually molded or overmolded using the silicone polymer of the invention.

BRIEF DESCRIPTION OF THE DRAWINGS

FIG. 2B is a graph showing weight percentage versus temperature with a temperature ramp rate of 10° C. per minute for the specific composition of Example 1 of the present invention.

DETAILED DESCRIPTION OF THE INVENTION

Figure 1:
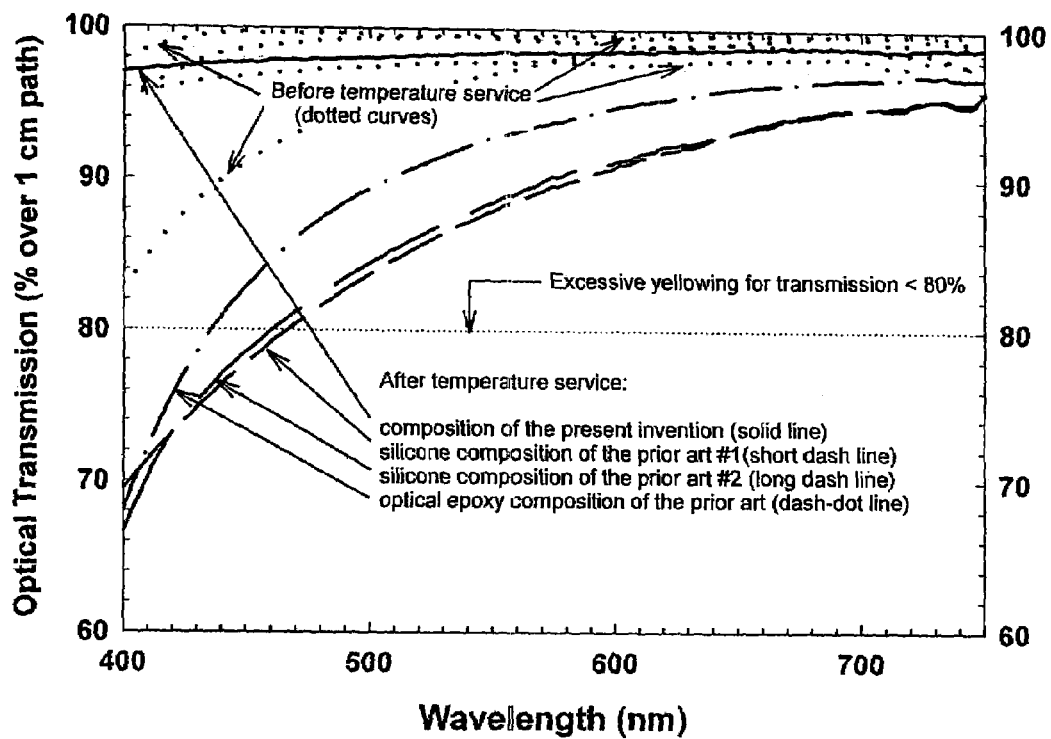
FIG. 1 is a graph showing the optical transmission versus wavelength before and after exposure to temperature service of prior art optical polymer compositions and of a specific composition in accordance with the present invention (Example 1).

A silicone composition having the optical thermal properties set forth in the summary of the invention and other advantageous properties is a product of two high phenyl containing components cross-linked with a high refractive index catalyst, which in the following description are called Composition A or Part A, Composition B or Part B and Composition C or Part C, respectively.

Composition A or Part A

Generally speaking, Part A is a siloxane copolymer which is the product of a polymerization reaction among mono-, di- tri and/or tetrafunctional silane reagents. The terms mono-, di, tri, and tetra-functional silane reagents are well understood by those skilled in the art, and are therefore explained here only briefly. A monofunctional reagent in this regard has only one hydrolysable group such as chloro (or other halogen) or an alkoxy group attached to the silicon atom with all other valences of the silicon atom being occupied by non siloxane (Si—O—Si) bond forming groups such as alkyl, vinyl, phenyl, substituted phenyl or like groups. As is known in the art, during the polymerization reaction the monofunctional reagent terminates the chain. A difunctional reagent has two hydrolysable groups, a tri-functional reagent has three hydrolysable groups and a tetra-functional reagent contains four hydrolysable groups. As is known in the art, during the polymerization reaction a difunctional reagent builds a linear chain and trifunctional and tetrafunctional reagents build a branched chain of polysiloxanes.

It is an important feature of the Part A siloxane copolymer component used in the present invention that it contains a high percentage of phenyl groups. The high refractive index of Part A and also of the cross-linked polysiloxane composition of the invention is attributed to the high percentage of phenyl groups in the composition. The presently preferred reagents from which Part A is formed are: phenyltrichlorosilane (trifunctional), methylvinyldichlorosilane (difunctional), diphenyldichlorosilane (difunctional) and phenylmethylvinylmethoxysilane (monofunctional). However, it should be understood that another reagent could replace each of these reagents where instead of a chloro function an alkoxy (methoxy or ethoxy) group would be present. Instead of a methyl group attached directly to the silicone atom an ethyl, propyl or other alkyl group up to approximately 8 carbons, could be present in these reagents, although methyl and ethyl, especially methyl, are preferred. The phenyl group itself could also be substituted, with an alkyl, such a methyl or ethyl group, although unsubstituted phenyl is preferred. These substitutions give rise to reagents that are equivalent from the viewpoint of their ability, or lack of it, to form siloxane bonds.

The function of the phenyl (or substituted phenyl such as tolyl) groups in causing high refractive index has been well documented. The vinyl group present in these reagents and in the resulting Part A or Composition A is utilized in the cross-linking reaction with silicon-hydride (Si—H) groups which are present in Part B or Composition B.

What is important for the purposes of the present invention is that, broadly speaking, 50 to 90 weight percent of the Composition A or Part A be of phenyl ($C_6H_5$) units. Preferably approximately 60 to 75 weight percent of Composition A or Part A is of phenyl ($C_6H_5$) units. Whether the above-noted weight percentages of phenyl units are attained in Part A with the same reagents as provided in the examples or with other reagents, is not important as long as the reagents are substantially equivalent from the stand point of forming siloxane bonds and also provide the required weight percentage of phenyl units in the polysiloxane product. In this regard phenyl groups can be replaced with methyl or other alkyl groups and visa versa, as long as the required weight percentage of phenyl groups is present in the resulting product. For example, some or all of the trifunctional reagent phenyltrichlorosilane could be substituted for methyltrichlorosilane, tetrachlorosilane, and/or tetraethoxysilane and some of the methylvinyldichlorosilane could be substituted for phenylvinyldichlorosilane to provide the required percentage phenyl units in the product, Part A.

The range of vinyl functions in Part A is best expressed in terms of mol percents. Broadly speaking approximately 1.0 to 5.8 mmols of vinyl groups are present in 1.0 gram of Part A. Preferably 2.0 to 4.0 mmols of vinyl groups are present in 1.0 gram of Part A.

The refractive index of Composition or Part A is between 1.50 to 1.60, preferably between 1.55 to 1.60.

The molecular weight of Composition or Part A may be in the range of 400 to 10,000 Daltons (D), preferably in the range of 400 to 4,000 D, even more preferably in the range of 900 to 2,600 D.

In a broad sense, 0 to 80 percent of Composition or Part A could be made of a trifunctional and/or tetrafunctional reagent; 0 to 100 percent of Part A could be made of a difunctional reagent, and 0 to 75 percent of Part A could be made of a monofunctional reagent, as long as the required number (percentage) of phenyl and vinyl groups are present in the product. In this connection it should be expressly understood that the ranges provided in this description do not contemplate a product wherein the percentage of the components adds up to more than 100%, nor a reaction where the total percentage of the reactants adds up to more than 100%.

Those skilled in the art will also understand that in the event no tri-functional or tetra-functional reagent is used to make Part A, then the resulting siloxane polymer or oligomer is linear. Such polymer or oligomer is possible, although presently not preferred within the scope of the present invention. In the event no di-functional reagent is used in the reaction forming Part A, then the resulting polymer or oligomer will be highly branched. Such a product is also within the scope of the present invention, although not presently preferred.

Presently the following ranges are preferred for the reagents from which Part A is formed: tri-functional and/or tetra-functional 7 to 25%; di-functional 40 to 70%; mono-functional 18 to 60%.

Formula 1 below illustrates an empirical formula for a class of preferred embodiments of Part A, which are obtained by copolymerization of tri-, di-, and mono-functional reagents. Those skilled in the art will understand that the formula is only an illustrative example of the structure of such a copolymer, because the formation of the siloxane bonds among the reagents is considered to be random.

Formula 1

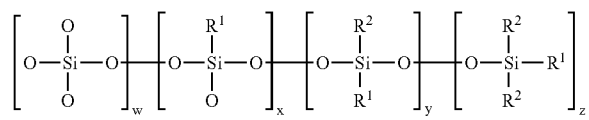

where $R^1$ is vinyl, an alkenyl group having 3 to 8 carbons, phenyl or methyl or ethyl substituted phenyl;

$R^2$ is methyl, an alkyl group of 2 to 8 carbons, phenyl or methyl or ethyl substituted phenyl;

w represents molar percentage range between 0 and 80%;

x represents molar percentage range between 0 and 80%;

y represents molar percentage range between 0 and 100%, and z represents molar percentage range between 0 and 75%, where $w+x+y+z=100\%$.

Preferably, as is noted above, w represents molar percentage range of 0;

x represents molar percentage range between 7 and 25%;

y represents molar percentage range between 40 and 70%, and z represents molar percentage range between 18 and 60%, where $w+x+y+z=100\%$.

General Procedure for the Preparation of Composition A or Part A

Generally speaking the tetra- tri-, di- and mono-functional reagents described above (as applicable) are mixed and allowed to react and co-polymerize in exothermic reactions in the presence of water and a low molecular weight alkanol, such as methanol, under the protective blanket of an inert gas, such as $N_2$. During this reaction, termed "resin hydrolysis" a siloxane oligomer (organic) phase and an aqueous phase is formed. The aqueous phase contains hydrochloric acid which is formed in the reactions, and which also acts as a catalyst for the reactions forming siloxane bonds. The organic phase is separated from the aqueous phase and sufficient sodium hydroxide (or equivalent strong base) is added to neutralize any residual acid and to bring the pH of the organic phase to approximately 8. In the following reaction, termed "resin condensation" the base acts as a catalyst. This step of "resin condensation" is accomplished by heating the mixture under the blanket of an inert gas ($N_2$) and by removing and collecting the water that is formed in the condensation step. Once the temperature of the reaction mixture reaches 135° C., the mixture is allowed to cool. Normal hexane is added to the resulting siloxane copolymer resin (organic phase) to prevent formation of intractable emulsions, and the organic phase is washed with water until all base is removed from the resin. The latter is termed the "resin washing" step. Thereafter, in a step termed "stripping", the hexane is removed from the resin by evaporation with heat and vacuum. After all hexane has been removed, the liquid resin is filtered to give Composition A or Part A. A more detailed description of the process of preparing a specific example of Part A is provided in the section titled Specific Examples, below.

Composition B or Part B

Generally speaking, Part B is also a siloxane copolymer which is the product of a polymerization reaction among mono-, di-, tri- and/or tetra-functional silane reagents. The considerations regarding mono-, di-, tri and tetra-functional silane reagents described above in connection with Part A are, generally speaking applicable here also. However, for Part B it is not only important to have a high phenyl content (to provide the required high refractive index) but Part B should also include silicon-hydride (Si—H) moieties, because these moieties are utilized in the cross-linking reaction with the vinyl moieties included in Part A.

The presently preferred reagents from which Part B is formed are: phenyltrichlorosilane (trifunctional), diphenyldimethoxysilane (di-functional) and dimethylchlorosilane (($CH_3)_2HSiCl$ mono-functional and containing a hydride function). As in the formation of Part A, each of these reagents could be replaced by another reagent where instead of a chloro function an alkoxy (methoxy or ethoxy) group would be present, and similarly the alkoxy function could be replaced with chloro. Instead of a methyl group attached directly to the silicon atom an ethyl, propyl or other alkyl group up to approximately 8 carbons, could be present in these reagents, although methyl and ethyl, especially methyl are preferred. The phenyl group itself could also be substituted with an alkyl group or an alkyl group substituted with a phenyl group as is described for Composition A. The foregoing represent substitutions which are equivalent from the viewpoint of forming siloxane bonds.

Broadly speaking, 30 to 90 weight percent of the Composition B or Part B is of phenyl ($C_6H_5$) units. Preferably approximately 50 to 80 weight percent of Composition B or Part B is of phenyl ($C_6H_5$) units. As noted in connection with Part A, for Part B it is also not critical that the above-noted weight percentages of phenyl units are attained with the same reagents as provided in the examples, as long as the reagents are substantially equivalent from the stand point of forming siloxane bonds, provide the required weight percentage of phenyl units in the polysiloxane product and include silicone hydride function utilized in subsequent cross-linking with Part A. Thus the methyl (or other alkyl) group could be replaced with phenyl (or with substituted phenyl) and visa versa, as described in connection with Composition A or Part A, as long as the weight percentage of phenyl groups is in the herein described range. It is also a requirement that the structure of Composition B be such that it is soluble in the prescribed weight percentage and form of Composition A chosen for formulation of an optical clear crosslinking mixture. Inadequate solubility will result in separation of the different Compositions within the crosslinking formulation; this separation will be expressed in the formation of haze which will eliminate the desired optically clear behavior.

The range of hydride functions in Part B is best expressed in terms of mol percents. Broadly speaking approximately 1.8 to 8 mmols of hydride groups are present in one gram of Part B. Preferably 2.0 to 6.0 mmols of hydride groups are present in one gram of Part B.

The refractive index of Composition or Part B is between 1.50 to 1.60, preferably between 1.52 to 1.58.

The molecular weight of Composition or Part B may be in the range of 100 to 10,000 Daltons (D), preferably in the range of 100 to 4,000 D, even more preferably in the range of 300 to 2,000 D.

In a broad sense, 0 to 80 percent of Composition or Part B could be made of a tri-functional and/or tetra-functional reagent; 0 to 100 percent of Part B could be made of a di-functional reagent, and 0 to 75 percent of Part B could be made of a mono-functional reagent, as long as the required number (percentage) of phenyl and hydride groups are present in the product. As in connection with the description of Part A, those skilled in the art will understand that in the event no tri-functional or tetra-functional reagent is used to make Part B, then the resulting siloxane polymer or oligomer is linear. In the event no di-functional reagent is used in the reaction forming Part B, then the resulting polymer or oligomer is highly branched. Presently the following ranges are preferred for the reagents from which Part B is formed: tri-functional 10 to 25%; di-functional 20 to 60%; mono-functional 25 to 60%.

Formula 2 below illustrates an empirical formula for a class of preferred embodiments of Part B, which are obtained by copolymerization of tri-, di-, and mono-functional reagents.

Formula 2

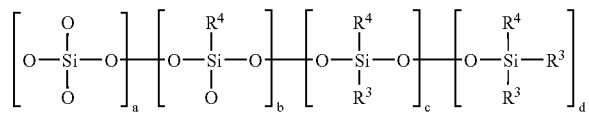

where $R^3$ is methyl, an alkyl group having 2 to 8 carbons, phenyl or methyl or ethyl substituted phenyl;
$R^4$ is hydrido (H), methyl, an alkyl group having 2 to 8 carbons, phenyl or methyl or ethyl substituted phenyl;
a represents molar percentage range between 0 and 80%;
b represents molar percentage range between 0 and 80%;
c represents molar percentage range between 0 and 100%, and
d represents molar percentage range between 0 and 75%, where $a+b+c+d=100\%$.

Preferably, as is noted above,
a represents molar percentage range of 0%;
b represents molar percentage range between 10 and 25%;
c represents molar percentage range between 20 and 60%, and
d represents molar percentage range between 25 and 60%, where $a+b+c+d=100\%$.

General Procedure for the Preparation of Composition B or Part B

The procedure of preparing Composition B or Part B from the the tetra-, tri-, di- and mono-functional reagents, described above (as applicable) is substantially similar to the procedure of preparing Part A. Thus, in the "resin hydrolysis" step the reagents (phenyltrichlorosilane, diphenyldimethoxysilane and dimethylchlorosilane in the preferred embodiment) are mixed and allowed to react and co-polymerize in exothermic reactions in the presence of water and a low molecular weight alkanol, such as methanol, under the protective blanket of an inert gas, such as $N_2$. The acidic aqueous phase formed in this step is separated from the organic phase that contains the resin formed in the reactions. The liquid resin obtained by "hydrolysis" is washed with water until neutral. In the next step, volatile materials are removed by evaporation in vacuum while heat is applied. Thereafter, the resin is filtered to give Composition B or Part B. A more detailed description of the process of preparing a specific example of Part B is provided in the section titled Specific Examples, below.

General Procedure for the Preparation of Composition C or Part C (Cross-linking Catalyst)

Part C is manufactured by adding sufficient soluble catalyst of the hydrosilation type well known in the art to Composition A or Part A to give an overall elemental catalyst concentration between 100 to 200 ppm. The two reagents are mixed well then devolatilized with heat at reduced pressure. The types of hydrosilation catalysts can be, but are not restricted to, platinum divinyltetramethyldisiloxane complex, tris(triphenylphosphine)rhodium I chloride, platinum carbonyl cyclomethylvinyl siloxane complex, platinum octanaldehyde/octanol complex and platinum cyclovinylmethylsiloxane catalyst.

Although preferred embodiments of the catalyst are described below it is important to understand that any platinum or like hydrosilation catalyst known in the art can be used in the present invention. What is important is that the catalyst complex is mixed into Composition A to give the desired catalyst concentration and maintain solubility at a high refractive index (1.545 or greater).

Preparation of the Cross-linked High Refractive Index Composition of the Invention The cross-linked high refractive index thermally stable and optically clear composition of the invention is prepared by admixing Part A, Part B with the catalyst (Part C), and allowing the admixture to cross-link (cure) by application of heat. The temperature to which the composition must be exposed for cross-linking (curing) depends on the precise nature of the components and also on the consistency (hardness) desired in the final product, and can be arrived at by routine experimentation. It is important to understand that compositions (resins) of varying consistency, ranging from soft gel to hard solid can be obtained in accordance with the present invention, depending on the amount of Part B added to a unity of weight of Part A. As noted above, even the temperature applied in the curing process can influence the hardness of the cured final product.

In accordance with the invention for 100 parts (ppH) of Composition A or Part A, 40 to 200 parts (ppH) of Part B are used. Preferably, for 100 ppH of Part A, 45 to 185 ppH of Part B are used. The amount of catalyst (Part C) is important only to the extent that the cross-linking reaction be catalyzed. Using the presently preferred catalyst, generally speaking 1.0 to 40 ppH of Part C (representing 100 to 200 ppM elemental platinum) is used for 100 ppH of Part A. Preferably, 2.0 to 20.0 ppH of Part C is used for 100 ppH of Part A.

One presently preferred formulation of the cross-linked high refractive index thermally stable and optically clear composition of the invention which is well suited for use as encapsulating material of the light-emitting diodes was obtained by blending and curing a mixture of the following specific components and amounts:

Specific embodiment of Part A, 100 ppH having a refractive index ($n_D$) of 1.567;
Specific embodiment of Part B, 70 ppH having a refractive index ($n_D$) of 1.517, and
Specific embodiment of Part C, 6 ppH having a refractive index ($n_D$) of 1.565.

In this formulation of the resin of the invention Part A represents 57% by weight of the overall composition; Part B represents 40% and Part C represents 3.0%. The mixture or blend was cured at 150° C. in a circulating air oven for 30 minutes. This composition has a refractive index ($n_D$) of 1.56 with light of 589 nm wavelength measured at 25° C., and a hardness durometer Type A of 32. After additional post curing at 150° C., a durometer Type A hardness was measured at 40.

EXPERIMENTAL SECTION, DETAILED DESCRIPTION OF THE PREPARATION OF THE SPECIFIC EXAMPLES

The Tables and detailed description provided in the ensuing section pertain to actual production and data of specific examples (batches) of the components of the invention, and will be readily understood by those skilled in the art of silicone chemistry and manufacturing technology.

Method/Procedure—Part A

TABLE 1

Formulation: RESIN Part A

| PpH | Ingredient | grams | F.W. |
|---|---|---|---|
| 100.00 | Phenyl $SiCl_3$ | 1000.00 | 211.55 |
| 110.25 | Phenyl MeViSiOMe | 1102.50 | 178.306 |
| 66.70 | $MeViSiCl_2$ | 667.00 | 141.072 |
| 269.00 | Di-Phenyl $SiCl_2$ | 2690.00 | 253.20 |
|  | Sub-Totals: | 5459.50 |  |
| 739.88 | Methanol $CH_3OH$ | 7398.80 | 32.042 |
| 419.47 | R.O. Water | 4194.70 | 18.015 |
|  | Sub-Totals: | 11593.50 |  |
|  | Over-all Totals: | 17053.00 |  |

Process: Resin Hydrolysis:

The reagents identified in Table 1 were placed in a 22 liter round bottom flask equipped with stirrer, temperature sensor, Claisen adapter, condenser and ability to pass $N_2$ gas, and an external cooling water bath. Water and methanol were first added while the flask was cooled by the external water bath. The silane reagents were premixed and were added gradually under a $N_2$ blanket, with an initial temperature of the reactants at approximately 20° C. During the addition of the silane reagents, the temperature rose and reached a maximum of approximately 50° C. After the addition of the silane reagents was completed the reaction mixture was stirred for approximately one hour. Stirring was then stopped and the aqueous and organic phases were allowed to separate for at least one hour. The top aqueous phase was then removed by vacuum siphoning. The net weight of the organic phase was 4227 grams. In a similar run the molecular weight of the resin was determined to be 582 D and polydispersity (Poly D.) was measured at 1.44.

Resin Condensation:

The acid of the organic phase was neutralized with aqueous sodium hydroxide to neutrality and then sufficient NaOH was added to make the mixture slightly alkaline (approximately pH 8). Then the mixture was stirred and heated under a protective blanket of $N_2$ until an internal temperature of 135° C. was reached. Water started collecting in a trap when the internal temperature was at approximately 60° C., and after the internal temperature reached 130° C., the collection of water substantially slowed. After cooling, the condensed resin was weighed at 4038 grams.

Resin Washing:

The condensed resin was mixed with an equal volume of n-hexane and washed successively with water (typically 2 to 4 times) until the resin was neutral. Each water wash weighed approximately 505 grams. Adding hexane was necessary to prevent formation of intractable emulsion during the washing process.

Removal of Volatiles (Stripping):

Vacuum was applied carefully to the stirred mixture obtained above, and gentle heating was started slowly and increased gradually. A light $N_2$ purge was applied when the internal temperature reached approximately 44° C. The internal temperature was allowed to rise to 165 to 170° C., and was maintained for 30 minutes while vacuum and a light $N_2$ purge was also applied. Thereafter, the mixture was allowed to cool while still under vacuum. 3955 grams of condensed resin was recovered in this process.

The condensed liquid resin was filtered to remove any particulates. If deemed necessary the resin could also be treated with activated carbon. 3812 grams of the condensed resin (Part A) was obtained after filtration.

Data of Part A $n_D$=1.568 @ 25.0° C.

(For another batch $n_D$ was measured at 1.567)

Viscosity (Brookfield)=1372 cps

Vinyl Content=2.66 mmole vinyl/gm sample

Silanol Content:=0.07%

Non-Volatile Content:=97.7%

MW=1064 Poly.D. 1.68

Method/Procedure—Part B

TABLE 2

Formulation: RESIN XL Part B

| PpH | Ingredient | grams | F.W. |
|---|---|---|---|
| 100.00 | Phenyl $SiCl_3$ | 1000 | 211.55 |
| 134.18 | DiMethyl Chlorosilane $(Me)_2HSiCl$ | 1342 | 94.62 |
| 187.84 | Di-Phenyl $Si(OMe)_2$ | 1878 | 244.36 |
|  | Sub-Totals: | 4220 |  |

TABLE 2-continued

Formulation:
RESIN XL Part B

| PpH | Ingredient | grams | F.W. |
|---|---|---|---|
| 466.7 | Methanol CH$_3$OH | 4667 | 32.042 |
| 265.2 | R.O. Water | 2652 | 18.015 |
| | Sub-Totals: | 7319 | |
| | Over-all Totals: | 11,539 | |

The reagents identified in Table 2 were placed in a 22 liter round bottom flask equipped with stirrer, temperature sensor, Claisen adapter, condenser and ability to pass N$_2$ gas, and an external cooling water and ice bath. Water and methanol were first added while the flask was cooled by the external ice-water bath. The silane reagents were premixed and were added gradually with an initial temperature of the reactants at approximately 13° C. During the addition of the silane reagents at approximately 56 g per minute, the temperature rose and reached a maximum of approximately 42° C. After the addition of the silane reagents was completed, the reaction mixture was stirred for approximately two hours. Stirring was then stopped and the aqueous and organic phases were allowed to separate for at least one hour. Once separated, the top aqueous phase was removed by vacuum siphoning. The net weight of the bottom organic phase was 3055 grams.

Resin Washing:

The liquid resin obtained above was washed successively with water until the resin was neutral. Each water wash weighed approximately 1500 grams.

Removal of Volatiles (Stripping):

Vacuum was applied carefully to the stirred mixture obtained above, and gentle heating was started slowly and increased gradually. A light N$_2$ purge was applied when the internal temperature reached approximately 60° C. The internal temperature was allowed to rise to 75 to 80° C., and immediately thereafter allowed to cool while still under vacuum and a light N2 purge. The liquid resin was filtered to remove any particulates. If deemed necessary the resin could also be treated with activated carbon. 2871 grams of liquid resin (Part B) was obtained after filtration.

Data of Part B
$n_D$=1.519 @ 25.0° C.
(For another batch $n_D$ was measured at 1.517 @ 25° C.)
Viscosity @ 25C:=25.6 cps
Hydride Content:=4.42 mmole Hydride/gm sample
Silanol Content:=0.58%
Non-Volatile Content:=85.68%
MW=446 Poly.D. 1.13

Method/Procedure—Catalyst (Part C)

A batch of high refractive index catalyst was prepared from the following ingredients: 1 g of platinum divinyltetramethyldisiloxane complex solution in isopropyl alcohol, assayed at 1.38% elemental platinum, was mixed with to 100 g of the previously described Part A.

Volatile materials were removed from the intermediate product by evaporation in vacuum with a slight N$_2$ purge, while stirring the mixture and maintaining it at 60° C. for approximately 60 minutes.

Data of Catalyst (Part C) Obtained in the Described Batch
$n_D$=1.568 @ 25.0° C.
Specific Gravity (pycnometer) @ 25° C.=1.135
Elemental Platinum: ~138 ppm

EXAMPLES OF CROSS-LINKED
COMPOSITIONS OF THE INVENTION

Example 1

Elastomer Composition with Refractive Index of 1.57

The following ingredients are combined:

| | |
|---|---|
| Part A, described above | 55.00% by wt. |
| Part B, described above | 40.60% by wt. |
| Part C, described above | 4.40% by wt. |

The components are admixed until the mixture is completely homogenous. The mixture is de-aired under 25 mmHg vacuum or by letting stand for one hour or more at room temperature. Once the components are admixed together, the resulting formulation has the following properties:

Example 1

Properties of Formulation

| Property (at 25° C. unless noted) | Test Method | Typical Value |
|---|---|---|
| Cure Processing Characteristics | | |
| Uncured mixed viscosity | ASTM D-1084 | 200 cP |
| Viscosity increase at 8 hrs | ASTM D-1084 | +10 to +15% |
| Pot Life (2 × viscosity) | ASTM D-1084 | 3 days |
| Cure Time at 100° C. (212° F.) | Visual | 3 hours |
| Cure Time at 120° C. (248° F.) | Visual | 15 minutes |
| Cure Time at 150° C. (302° F.) | Visual | 3 minutes |
| Cure Time at 200° C. (392° F.) | Visual | 45 seconds |
| Optional Post Cure for Maximum Durometer hardness | ASTM D-2240 | >150° C. for >30 minutes |
| Cured Mechanical Properties | | |
| Cure Shrinkage, by volume | ASTM D-1217 | 2% |
| Physical Consistency | Visual | Like "hard rubber" |
| Shore A Durometer | ASTM D-2240 | 50 |
| Specific Gravity | ASTM D-1217 | 1.12 |
| Cured Thermal Properties | | |
| Glass Transition | TMA | 3° C. |
| Thermal Expansion by Volume | ASTM D-1903 | 5 × 10$^{-4}$ cc/cc/° C. |
| TGA Take-off (1% wt. loss, 10° C./min. in air) | ASTM D-3850 | 327° C. (see FIG. 2B) |
| Cured Optical Properties | | |
| Appearance | Visual | Crystal clear |
| Refractive Index, 589 nm | ASTM D-1218 | 1.567 |
| Refractive Index vs. Temp., 589 nm | ASTM D-1218 | −3.9 × 10$^{-4}$/° C. |
| Refractive Index vs. Wavelength | Prism coupler | (see FIG. 2C) |
| Optical Absorption | spectrophotometer | (see FIG. 2A) |

As noted above, properties of particular importance for optical polymers of the present invention are optical clarity, high temperature service, and high refractive index. Measured data pertaining to these properties are given in FIGS. 1, 2A, 2B, and 2C.

FIG. 1 discloses the optical properties of the composition of the present invention of Example 1 together with properties of certain prior art compositions. The data presented in FIG. 1 were taken before exposure to temperature at 120° C., and after exposure to 120° C. for 30 minutes and 6 hours, respectively of two prior art silicone compositions, of an epoxy composition of the prior art and of Example 1 of the present invention, respectively. The dotted lines represent before exposure to temperature service of these materials. As demonstrated by these curves, in contrast to the present invention, the prior art materials exhibit excessive degradation in optical transmission after temperature service. Specifically, in FIG. 1, composition #1 of the prior art is a phenyl silicone elastomer having a refractive index of 1.46. Subsequent to cure but prior to temperature service, prior art composition #1 exhibits excellent optical clarity with transmission greater than 95% (dotted line). After 30 minutes exposure to 120° C., composition #1 exhibits excessive yellowing with a loss of transmission at 400 nm to 70% (short dash line). Similarly, prior art composition #2, a phenyl silicone gel of the prior art with refractive index of 1.52, is degraded after 6 hours at 150° C., exhibiting degraded transmission of 67% at 400 nm (long dash line). An epoxy of the prior art shows yellowing after 30 minutes at 120° C. (dash-dot line) In contrast to the prior art polymers, a phenyl silicone resin of the present invention with a refractive index of 1.57 (Example 1), shows no degradation in transmission after temperature service of 6 hours at 150° C. (solid line).

Figure 2A:
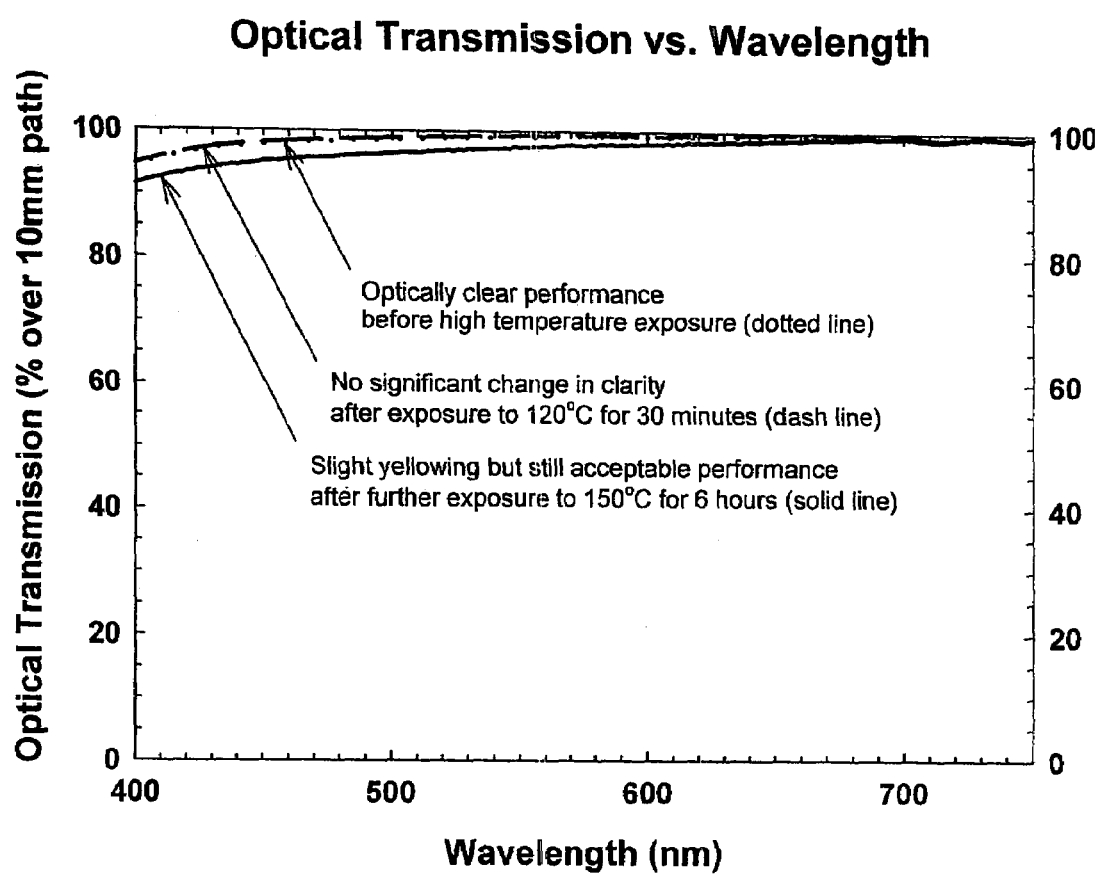
FIG. 2A is a graph showing the optical transmission versus wavelength before and after exposure to 120° C. temperature for 30 minutes and 6 hours respectively of the specific composition of Example 1 of the present invention.
Figure 2C:
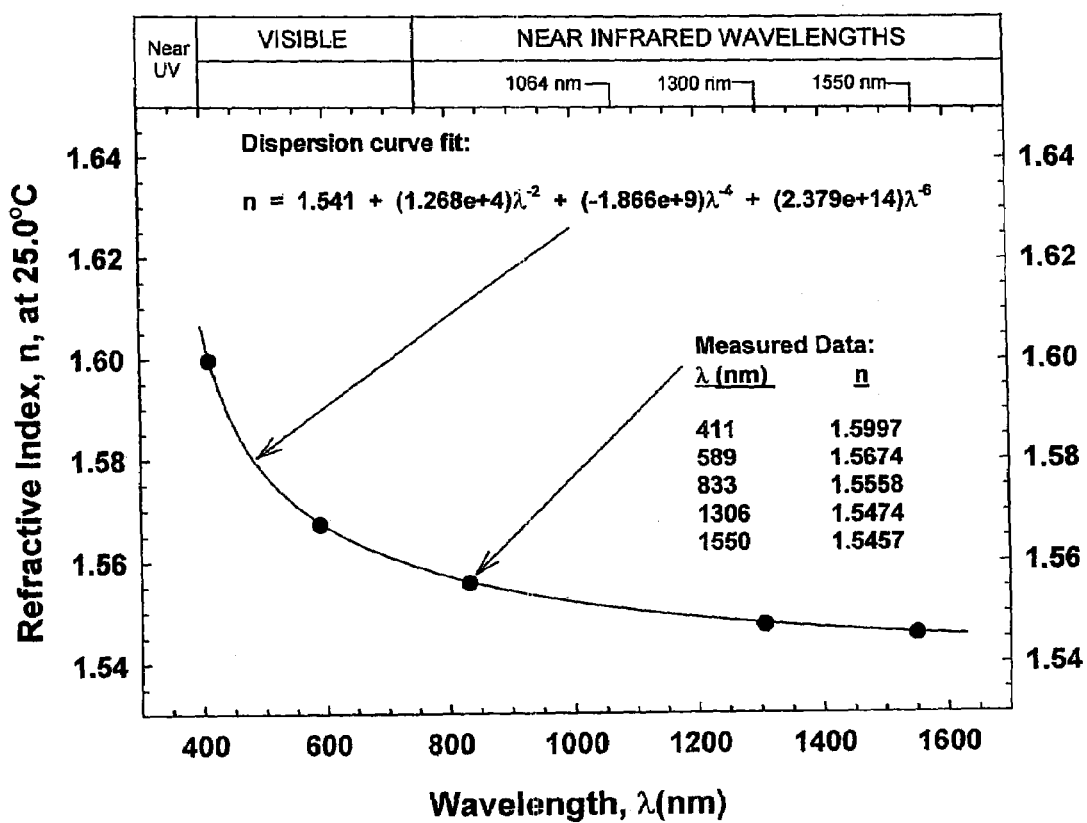
FIG. 2C is a graph showing the refractive index versus wavelength of the specific composition of Example 1 of the present invention.

FIG. 2A shows that the optical transmission for this formulation is above 90% over the range of 400 nm to 750 nm. This qualifies the composition for use in visible light applications such as lenses for visible light emitters and detectors. This composition of high refractive index of 1.567 (see FIG. 2C), can also be used as a support medium for phosphors used in white LEDs. FIG. 2B shows data obtained using a thermogravimetric analyzer with air atmosphere and a temperature ramp rate of 10° C. per minute. This data shows that the composition exhibits acceptable thermogravimetric stability after exposure to transient high temperature service of 300° C. Thus, with its transmission stability of acceptable optical transmission after exposure to 150° C. for 6 hours (FIG. 2A) and its thermogravimetric stability for transient temperature service demonstrated to temperatures above 300° C. (see FIG. 2B), the composition is further suitable as a support medium for high brightness white LEDs (HBLEDs) which may be operated at high junction temperatures or may be run through lead-free solder reflow processing.

Example 2

Gel Composition with Refractive Index of 1.57

The following ingredients are combined:

| | |
|---|---|
| Part A, described above | 63.36% by wt. |
| Part B, described above 1 | 30.00% by wt. |
| Part C, described above | 6.64% by wt. |

The components are admixed until the mixture is completely homogenous. The mixture is de-aired under 25 mmHg vacuum or by letting stand for one hour or more at room temperature. Once the components are admixed together, the resulting formulation has the following properties:

Example 2

Properties of Formulation

| Property (at 25° C. unless noted) | Test Method | Typical Value |
|---|---|---|
| Cure Processing Characteristics | | |
| Uncured mixed viscosity | ASTM D-1084 | 200 cP |
| Viscosity increase at 8 hrs | ASTM D-1084 | +5% |
| Pot Life (2 × viscosity) | ASTM D-1084 | >1 day |
| Cure Time at 150° C. (302° F.) | Visual | 30 minutes |
| Cured Mechanical Properties | | |
| Physical Consistency | Visual | Like "gel" |
| Shore 00 Durometer | ASTM D-2240 | 20 |
| Specific Gravity | ASTM D-1217 | 1.12 |
| Cured Optical Properties | | |
| Appearance | Visual | Crystal clear |
| Refractive Index, 589 nm | ASTM D-1218 | 1.570 |
| Refractive Index vs. Temp., 589 nm | ASTM D-1218 | $-4.0 \times 10^{-4}$/° C. |
| Refractive Index vs. Wavelength | prism coupler | (see FIG. 3B) |
| Optical Absorption | Spectrophotometer | (see FIG. 3A) |

Figure 3A:
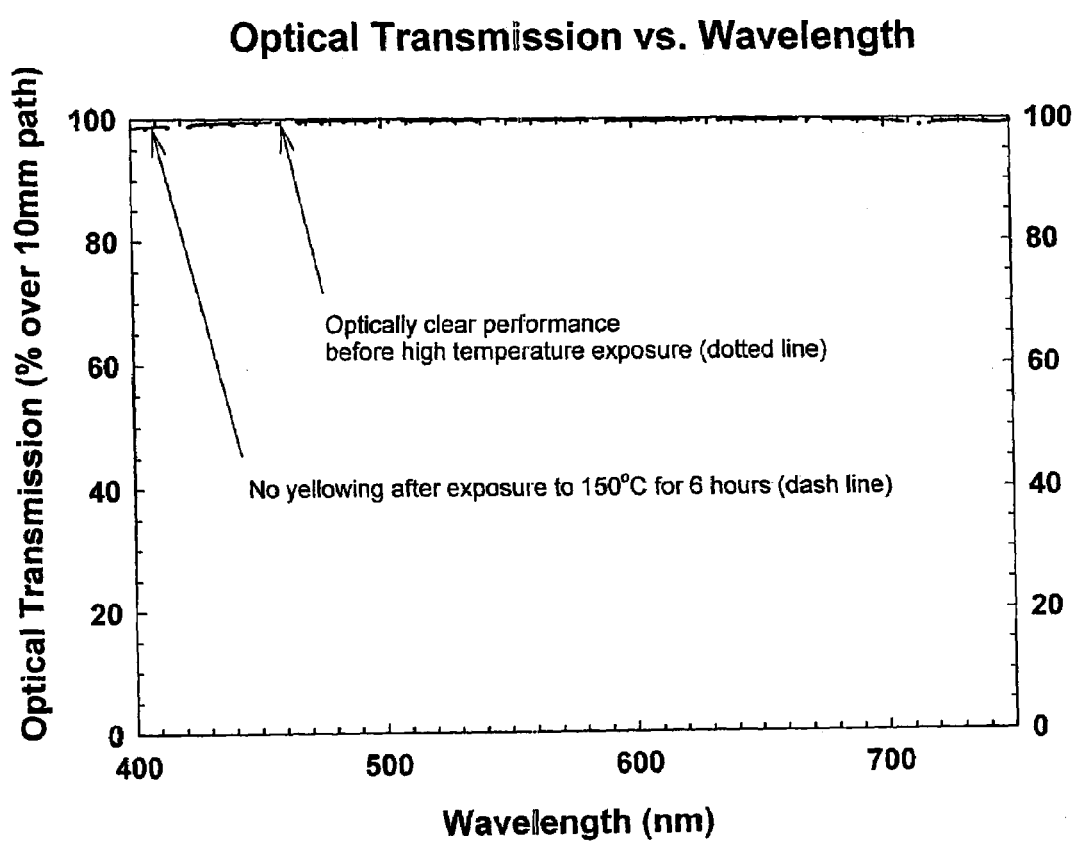
FIG. 3A is a graph showing the optical transmission versus wavelength before and after exposure to 120° C. temperature for 6 hours of the specific composition of Example 2 of the present invention.
Figure 3B:
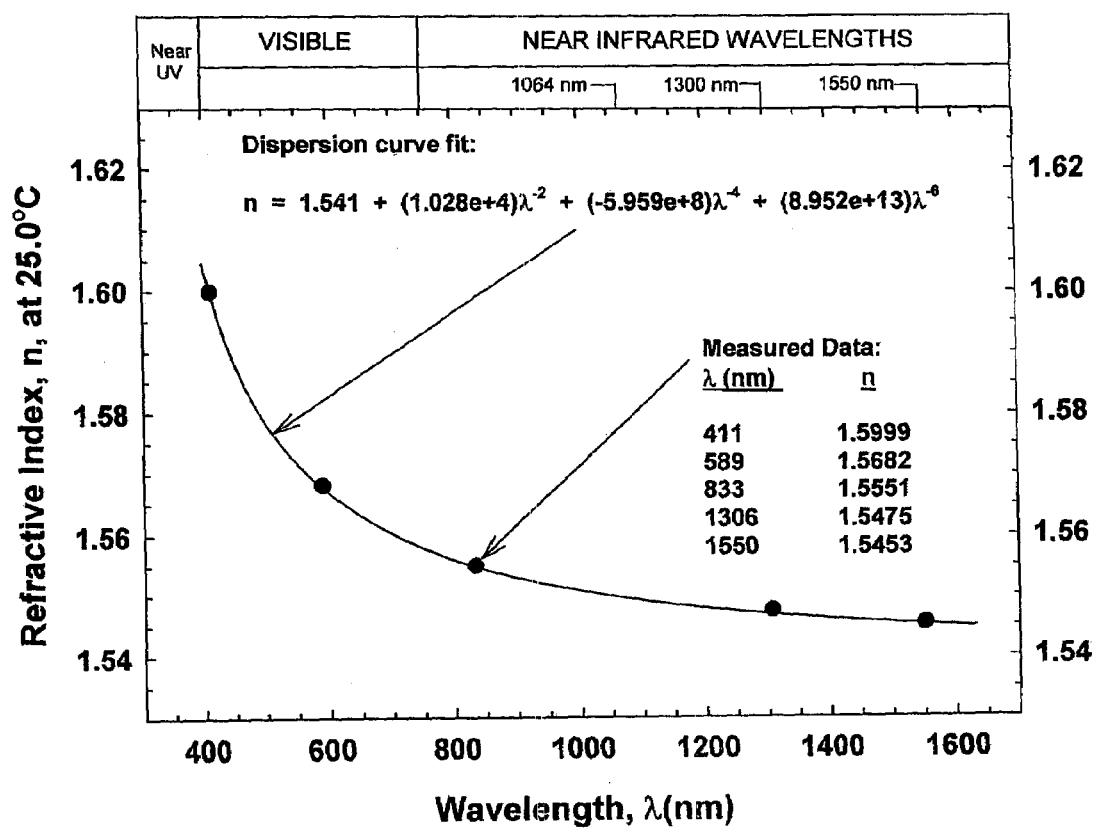
FIG. 3B is a graph showing the refractive index versus wavelength of the specific composition of Example 2 of the present invention.

Measured data pertaining to optical clarity, high temperature service, and high refractive index are given in FIGS. 3A and 3B. FIG. 3A shows the optical transmission for this Example 2 formulation is better than 95% over a 1 centimeter path length (dotted line) and remains so, even after exposure to a temperature service of 6 hours at 150° C. (dashed line). This enables the composition to be used in visible light applications such as soft encapsulation for visible light emitters and detectors. With its high refractive index of 1.5682 (see FIG. 3B), and its soft gel consistency, Example 2 is a candidate for use as a protective encapsulant above the emitting die of a high brightness LED. Its low viscosity also makes it suitable as a curable underfill material for flip chip applications. Flip chip underfill materials are well known in the art of semiconductor packaging. In one such application, a material is needed which will easily wick under a flip chip mounted vertical cavity surface emitting laser (VCSEL) and then cure at elevated temperature. The resulting optically clear gel layer provides the emitted VCSEL output beam with optical coupling to the fiber output embedded below the chip while helping to protect the VCSEL from atmospheric attack, and helping to relieve stresses between the chip and the mount caused by CTE mismatches.

Example 3

Gel Composition with Adjusted Refractive Index of 1.550

The following ingredients are combined:

| | |
|---|---|
| Part A, described above | 36.82% by wt. | linear, vinyl dimethyl endblocked dimethyl, diphenyl polysiloxane copolymer of a nominal refractive index of 1.52

| (prior art material) | 36.82% by wt. |
|---|---|
| Part B, described above | 21.36% by wt. |
| Part C, described above | 5.00% by wt. |

The components are admixed until the mixture is completely homogenous. The mixture is de-aired under 25 mmHg vacuum or by letting stand for one hour or more at room temperature. Once the components are admixed together, the resulting formulation has the following properties:

Example 3

Properties of Formulation

| Property (at 25° C. unless noted) | Test Method | Typical Value |
|---|---|---|
| Cure Processing Characteristics | | |
| Uncured mixed viscosity | ASTM D-1084 | 350 cP |
| Viscosity increase at 8 hrs | ASTM D-1084 | +4% |
| Pot Life (2 × viscosity) | ASTM D-1084 | >24 hours |
| Cure Time at 120° C. (248° F.) | Visual | 17 hours |
| Cure Time at 150° C. (302° F.) | Visual | 4 hours |
| Cured Mechanical Properties | | |
| Physical Consistency | Visual | Like "gel" |
| Shore 00 Durometer | ASTM D-2240 | 20 |
| Specific Gravity | ASTM D-1217 | 1.11 |
| Cured Optical Properties | | |
| Appearance | Visual | Crystal clear |
| Refractive Index, 589 nm | ASTM D-1218 | 1.550 |
| Refractive Index vs. Temp., 589 nm | ASTM D-1218 | $-3.9 \times 10^{-4}/°$ C. |
| Refractive Index vs. Wavelength | prism coupler | (see FIG. 3B) |
| Optical Absorption | Spectrophotometer | (see FIG. 3A) |

Figure 4A:
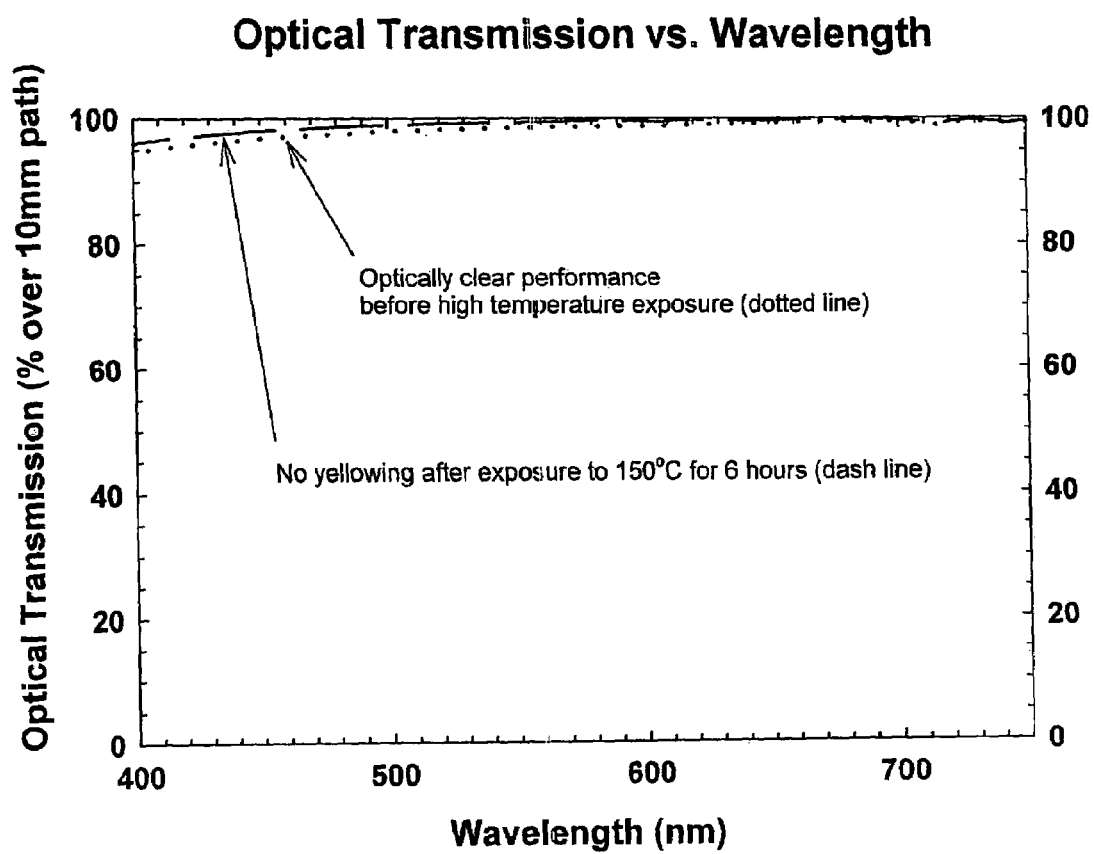
FIG. 4A is a graph showing the optical transmission versus wavelength before and after exposure to 120° C. temperature for 6 hours of the specific composition of Example 3 of the present invention.
Figure 4B:
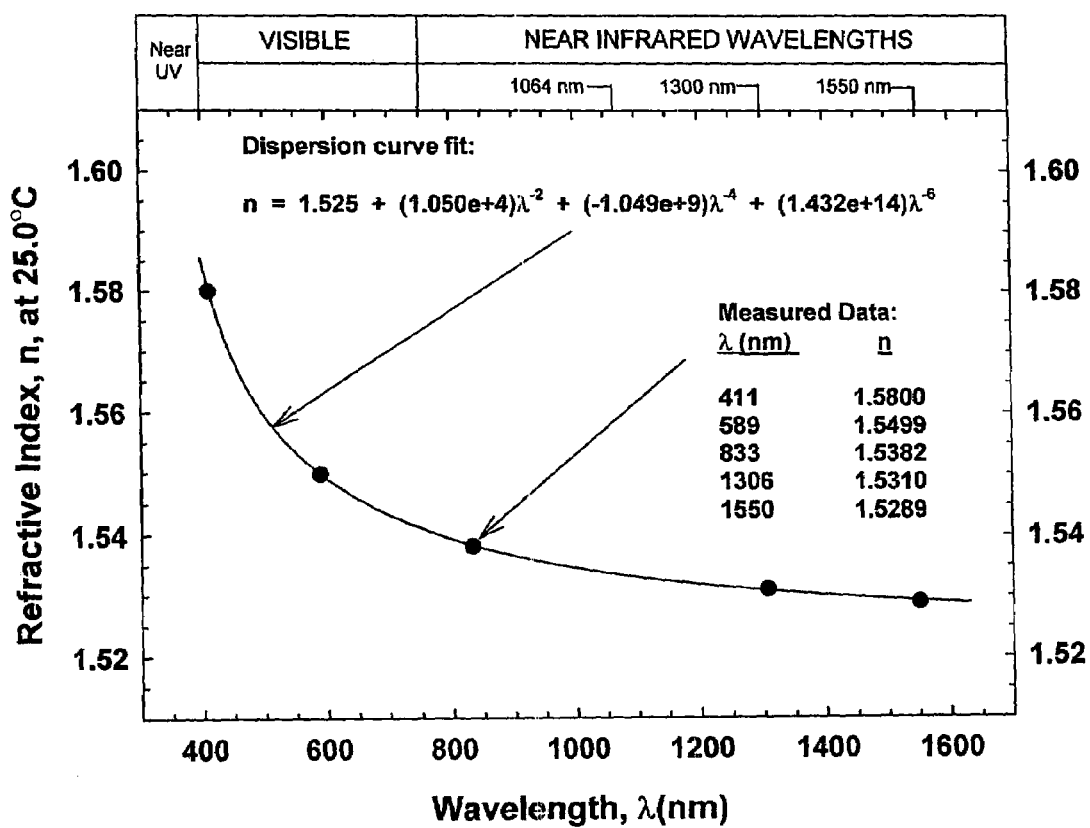
FIG. 4B is a graph showing the refractive index versus wavelength of the specific composition of Example 3 of the present invention.

As is shown in FIG. 4A, Example 3 has excellent optical clarity in the visible range before exposure to 120° C. for 6 hours (dotted line) and remains so after such exposure (dashed line). The composition has a refractive index in the range of 1.55 as shown in FIG. 4B. This gel formulation is also suitable for use as an encapsulant in high brightness LEDs. While exhibiting lower refractive index than the gel of Example 2 (1.57), this formulation contains a vinyl end blocked phenyl siloxane linear polymer that per se is in the prior art. Including a prior art siloxane polymer in the cross-linked composition of the present invention, as long as the prior art polymer is intersoluble with the novel components of the present invention and the required parameters of the invention are maintained, has some advantages in some applications. For example, the cost of this prior art vinyl end blocked siloxane polymer is generally acknowledged to be lower than of the novel component parts of the present invention. The intersolubility of the novel components of the invention and of the vinyl end blocked prior art siloxane polymer also enables the vinyl end groups of the polymer to crosslink with the silicon-hydride functions of Part B. Including the vinyl end blocked or other suitable prior art siloxane polymers in compositions like Example 3 permits fine adjustment of the refractive index of the resulting crosslinked compositions between that of the prior art polymer (1.517) and that of Example 1 (=1.567) for the purpose of precise index matching of the material to various adjacent optical materials such as plastics, glasses, and semiconductors.

Example 4

Heat Cured Primer or Thin Film Coating of 1.57 Refractive Index

N-propyl bromide acting as solvent diluent is added to a mixing container. The following ingredients, acting as a solute, are added to the diluent in a concentration such that the final mixture is 1% solute and 99% diluent.

Solute

| Part A lot, described above | 63.36% by wt. |
|---|---|
| Part B, described above | 30.00% by wt. |
| Part C, described above | 6.64% by wt. |

The components are mixed until completely dissolved. The resulting product is a heat curable optical coating or phenyl silicone primer with excellent optical clarity and other properties shown in the following table.

Example 4

Properties of Formulation

| Property (at 25° C. unless noted) | Test Method | Typical Value |
|---|---|---|
| Flow & Laydown Characteristics | | |
| Viscosity | | 1 Cp |
| Specific Gravity | | 1.34 |
| Surface Energy | | 25 dynes/cm |
| Boiling Point | | 70° C. |
| Solvent drying time, dip coat method | | 3 minutes |
| Coating Concentration by Weight | | 1% |
| Coating Cure Characteristics | | |
| Pot Life (2 × viscosity) | ASTM D-1084 | >24 hours |
| Cure Time at 120° C. (248° F.) | Visual | 15 minutes |
| Cure Time at 150° C. (302° F.) | Visual | 3 minutes |
| Cured Mechanical Properties | | |
| Physical Consistency | Visual | Like "gel" |
| Shore 00 Durometer | ASTM D-2240 | 20 |
| Specific Gravity | ASTM D-1217 | 1.12 |
| Cured Optical Properties | | |
| Appearance | Visual | Crystal clear |
| Refractive Index, 589 nm | ASTM D-1218 | 1.570 |
| Refractive Index vs. Temp., 589 nm | ASTM D-1218 | $-4.0 \times 10^{-4}/°$ C. |
| Refractive Index vs. Wavelength | Prism coupler | (see FIG. 3B) |
| Optical Absorption | spectrophotometer | (see FIG. 3A) |

The composition of Example 4 is a solvent suspended version of Example 2. The final cured properties of this composition are therefore close to those of Example 2. The composition of this example can be used to coat a substrate with a thin film coating by various means well known in the art, including but not limited to silk screening, dip coating, spray coating, spin coating, molding or casting. The solvent is then evaporated by allowing the material to stand at room temperature or at some elevated temperature, taking care not to exceed the boiling point of the solvent until substantially all of the solvent is evaporated. This ensures that the coating will not form voids or "popcorn" from violent boiling of the solvent. Once the solvent is removed, the coating may be hardened by further cross-linking (thermosetting) at 150° C. for 10 minutes or at higher temperatures for shorter times. The coating thus hardened adheres well to other silicone compositions that may subsequently be molded above it. These include any of the compositions of the present invention, but could also include silicone compositions of the prior art. The adhesion promotion properties of the coating may be enhanced by several means. First, the excess hydride content of the formulation can be increased above that given in the formulary in order to provide unoccupied hydride sites which can crosslink during heat cure not only with a hard substrate but also with the subsequently applied silicone formulation. Second, the primer cure schedule can be cut short in either time or temperature so that it becomes immobile but still has additional crosslinking sites not yet connected. Then once the overlying silicone is applied, a final post bake cure of the two materials together results in some crosslinking across the interface of the polymer coat and the overlying silicone. Third, the primer may itself by improved by addition of silicone adhesion promoters.

Versions of the coating of Example 4 may be prepared with different refractive indices, adjusted for suitable values using hybrid compositions such as that described for Example 3. When employed as a quarter-wave thick anti-reflection (AR) coating to minimize reflections, for example, between an optical semiconductor and air, it may be desirable to adjust the refractive index to obtain the ideal value of refractive index as indicated by the well known formula, $$n_{coating} = \{n_{air} \times n_{semi}\}^{1/2},$$

where $n_{coating}$, $n_{air}$, and $n_{semi}$ are the refractive indices of the quarter-wave-plate-matched gel, the air, and the optical semiconductor, respectively.

Application of the High Refractive Index, Thermally Stable Polysiloxane Resin of the Invention In the ensuing more general description of the applications of the novel silicone compositions of the present invention and elsewhere in this specification, where applicable, certain terms are defined as follows.

Unless otherwise specified, "optically clear" is taken to mean having an optical transmission of greater than 90% over a 1 cm path length at the intended wavelength of transmission as measured using a grating spectrophotometer with an instantaneous spectral bandwidth of 10 nm or less. "Excessive yellowing" is taken to mean a change in transmission from an optically clear state to a transmission of less than 80% over a one centimeter path at 400 nm wavelength.

Unless otherwise specified, "ultraviolet" is taken to mean a range of wavelengths from 100 nm to 400 nm, "visible" is taken to mean a range of wavelengths from 400 nm to 750 nm, and "near infrared" or "NIR" is taken to mean a range of wavelengths from 750 nm to 2000 nm.

Unless otherwise specified, "ionizing radiation" is taken to mean light or electromagnetic radiation at a wavelength less than 400 nm, or either electromagnetic or non-electromagnetic radiation with an accumulated dose of one million rads or greater. "Non-ionizing radiation" is taken to mean light or electromagnetic radiation at a wavelength of 400 nm or greater.

Unless otherwise specified, "high temperature service" is taken to mean steady state temperature exposure of the device or material in question to at least 1.50° C. (302° F.) for one hour or greater, and/or to at least 200° C. (392° F.) for less than one hour.

Unless otherwise specified, "index of refraction" or "refractive index" is taken to mean the value of refractive index of a medium measured at 25+/−0.5 degrees centigrade and 589 nm, as measured by the method of Abbé refractometry according to ASTM D-1218, or equivalent method. This definition is the convention in the optics industry, even when the intended wavelength of use of the material differs from 589 nm. "High refractive index" is taken to mean a value of refractive index greater than or equal to 1.545.

Unless otherwise specified, "low viscosity before cure" is taken to mean the absolute viscosity of an optical polymer in its uncured fluid state under the temperature and shear conditions encountered in the cure process, of 1000 centipoise (cP) or less.

In addition to having the advantageous optical properties of "high refractive index", "optical clarity" and ability to maintain optical clarity after "high temperature service", discussed in detail above, the novel silicone compositions also have the advantageous property of capable of being formulated to exhibit elastic moduli which range from soft gels (durometer values registering low on the Shore 00 scale of ASTM D-2240) to rubber-like hardness (values registering on the Shore A scale of ASTM D-2240) up to values for hard plastics (values registering on the Shore D scale of ASTM D-2240). (See specific examples 1 and 2)

Still another advantage of the compositions of the present invention over some of the optical polymers of the prior art is the availability of formulations which exhibit low viscosity prior to cure. This permits more rapid dispensing of material, more rapid cycling of molding equipment, and formation of molded parts with finer mechanical dimensions than can be achieved when the polymer is in the form of a high viscosity fluid prior to cure.

Still another advantage of polymers of the present invention is that because they have a high phenyl content they intrinsically resist ultraviolet radiation damage in a manner superior to some prior art optical polymers which are less thoroughly phenylated.

As noted above, the polysiloxane resin of the present invention can be utilized in all applications and devices where one or several of the above described properties of the resin are useful or provide an advantage. Generally speaking, several types of optical devices can be improved by substituting the phenyl silicone resin formulations of the present invention for the optical polymers of the prior art. These devices can be divided into the following groups: devices employing optical waveguide structures, devices employing bulk encapsulation, devices employing the polymer as a passive supporting matrix for photonically active elements, and discrete parts individually molded or overmolded using the optical polymer.

The need for optical clarity, high temperature service, and high refractive index for polymers used in planar waveguide devices are described in the reference Advances in Polymer Integrated Optics, IEEE Journal of Selected Topics in Quantum Electronics, Volume 6 No. 1, 2000 by Eldada et al. (expressly incorporated herein). In many planar waveguides the wavelengths of interest are in the near infrared range of the spectrum, typically centered at 1300 nm or at 1550 nm. Acceptable optical absorption is typically less than 0.1 dB/cm and acceptable temperature service is 120° C. steady state and as high as 250° C. transient, as is described in U.S. Pat. No. 5,850,498 (expressly incorporated herein by reference). It follows that optical waveguide structures benefit from using the novel compositions of the present invention as the waveguide core material. They can be constructed using the novel compositions of the present invention, as otherwise described in U.S. Pat. No. 5,850,498 and by Eldada et al., with only such modifications that will be readily apparent to those skilled in the art in light of general knowledge and the present disclosure.

In addition to the planar lightguiding structures described in the Eldada et al. reference, there are other lightguiding structures known in the art which benefit from using a liquid, gel or solid version of the novel silicone compositions of the present invention as the waveguide core material. These include flexible liquid lightguides, gel filled lightguides, illumination lightpipes, multimode lightguides, and single mode lightguides. Rather than being of planar geometry as are the waveguides of the Eldada et al. reference, these other lightguiding structures may be of circular, rectangular, or other arbitrarily shaped cross-section and may also have arbitrary curvature along the axis of light wave propagation. In one embodiment of such a lightguide, the core is made of a polymer of the present invention of a diameter appropriate for establishing a single mode of electromagnetic wave propagation or multimode electromagnetic wave propagation and the core is surrounded by a second lower refractive index polymer of the present invention or other optical polymer. As is well known in the art, requirements for optical clarity in these applications are also critical and similar quantitatively to those presented in the Eldada et al. reference for planar waveguides. Such non-linear waveguide structures can also be constructed by one skilled in the art using knowledge of the prior art and the novel compositions of the present invention with only such modifications that will be readily apparent to those skilled in the art in light of general knowledge and the present disclosure.

Bulk encapsulation of optical devices is used for protection of a light emitting or light sensing element such as a semiconductor die with associated wire bonds or other fragile features. Such encapsulation helps to protect against mechanical shock and intrusion of dust or moisture. It also serves at the same time as a transparent medium which improves index matching along the light path and supports propagation of a light signal through its bulk without significant reflection or attenuation of the signal. Specifically, in HBLEDs, there is a need for a light transmissive gel medium between the LED die and the outer lens. U.S. Pat. No. 6,204,523 B1 (incorporated herein by reference in its entirety, including its drawing figures) describes the criteria for optical polymers to serve as the light transmissive medium. The novel polymers of the present invention can be advantageously employed in this class of applications as bulk encapsulation material. In particular, the gels of the invention exhibiting high refractive index are advantageous when used in direct contact with the planar LED die emitting surface, because the high refractive index increases the light extraction efficiency of the device (see the publication ENCYCLOPEDIA OF CHEMICAL TECHNOLOGY fourth Edition, Volume 15 pp 225–226 (John Wiley & Sons Publishers) expressly incorporated herein by reference.)

The compositions of the present invention can also serve as a passive support matrix for photonically active materials such as phosphor powders, photonic crystals, quantum dots, microspheres, nanotubes, dyes, and the like. U.S. Pat. No. 6,417,019 (expressly incorporated herein by reference), describes the use of optically clear media to disperse and suspend phosphor powders above the LED emitting surface. Column 2, paragraph. 2 of this patent notes that various classes of polymers including silicone polymers may be suitable as support media, and further that such polymers are especially advantageous if they exhibit high refractive index in order to prevent reflection of incident light from the individual phosphor particles (col. 6, para. 3). Because the compositions of the present invention have these advantageous properties, they can be used as the support medium for phosphor powders used in white light emitting high brightness LEDs of the type disclosed in U.S. Pat. No. 6,417,019. To use the compositions of the present invention as such support medium one skilled in the art needs to apply only the present disclosure, general knowledge and the teachings of U.S. Pat. No. 6,417,019, with only such modifications that will be readily apparent to those skilled in the art in light of general knowledge and the present disclosure.

Another application of the compositions of the present invention is as a support matrix for fabrication of photonic crystals. As is now well understood in the prior art of photonic crystal fabrication, when microspheres of uniform size are closely packed into a three-dimensional periodic array, they can exhibit useful photonic bandgap properties. The compositions of the present invention are suitable for filling the interstitial gaps in such a close packed array and for adhering the entire assembly of spheres, rods, or other photonic crystal unit cells together in a permanent fashion. These devices can be constructed using the novel compositions of the present invention in a manner otherwise known in the art with only such modifications that will be readily apparent to those skilled in the art in light of general knowledge and the present disclosure.

Yet another example, for using the compositions of the present invention as a support matrix is the dispersal and permanent suspension of fluorescent powders in a spectrophotometric standard cell. Such cells are used, for example, to calibrate instruments to determine their response to unknown sources of fluorescence excitation, and can be constructed using the novel compositions of the present invention in a manner otherwise known in the art with only such modifications that will be readily apparent to those skilled in the art in light of general knowledge and the present disclosure.

In the field of HBLEDS, U.S. Pat. No. 6,274,924 (expressly incorporated herein by reference) discloses a premolded lens or the molding of a lens over the underlying portion of the assembly (sometimes denoted, "overmolding"). In the field of intraoccular lens implants prior art injection moldable optically clear silicone polymers are used to fabricate small lenses for implantation in the human eye. The novel compositions of the present invention can be employed advantageously in these and other optical devices where molding of the material is desired, because formulations in accordance with the present invention can meet the material requirements for casting, molding, or overmolding. In addition to exhibiting the properties of optical clarity, high temperature service, and high refractive index, the invented formulations provide low viscosity of the polymer mixture prior to cure, and adequately rapid cure times at elevated mold temperatures. Low pre-cure viscosity is advantageous for thermoset casting and molding because it improves the ability of the uncured polymer fluid to rapidly and thoroughly fill into mold features that define intricate optical features or smooth outer surfaces. Fast mold cycling and fast cure schedules, of the order of minutes or less, permit adequately rapid production throughput for the molding equipment. Thus, molded products utilizing the novel compositions of the present invention can be manufactured by one skilled in the art utilizing general knowledge, the disclosures of U.S. Pat. Nos. 6,274,924, other prior art patents and the present disclosure with only such modifications that will be readily apparent to those skilled in the art in light of general knowledge and the present disclosure.

Certain additives such as anti-oxidants, lubricity additives, surfactants, fungicides, flame retardants, contrast enhancers, UV stabilizers, photostabilizers, fluorescent dyes, absorbing dyes, electrical conductivity additives, thermally conductive powders, chelation or sequestration agents, acid scavengers, metal passivators and fortifiers such as oxide powders, fluorescing powders, nanotubes, nanospheres, microspheres, micropowders, nanopowders, pigments, liquid crystals, clays can be included in compositions of the present invention provided that the key performance parameters for the composition of optical clarity, high refractive index, and high temperature service are maintained. The compositions of the present invention can also be employed as a bulk medium to physically support arrangements of various fortifier species for the purpose of forming a photonic crystal, a Bragg reflector, a frequency doubling film, an optical switch medium, or numerous other photonically active materials.

Still further, cure inhibitors, catalysts, adhesion promoters, surface passivation agents, and passivation agents for mobile ionic species can be included in the compositions of the present invention as long as the properties of optical clarity, high refractive index, and high temperature service are maintained.

It is well known in the art of polymer coatings, grease plating compositions, paints, and inks that a liquid or solid material can often be dispersed in a suitable carrier solvent in order to prepare a coating composition. The compositions of the present invention can also be included in such solvent dispersed formulations (see Example 4). These may be used, for example, for preparation of thin optical films, planar waveguide layers, planar waveguide cores, and optically clear silicone primer coats. Suitable carrier solvents are those with which the compositions of the invention are miscible and which have suitable evaporation rates for the intended application. Such solvents include hydrocarbon solvents (such as xylene), acetone, tetrahydrofuran and halogenated solvents such as 1-bromopropanol, n-propyl bromide. The carrier solvents should be free of contaminants which might degrade optical performance in the dried coating. Suitable solvents should also be free of contaminants which interfere with cross-linking (cure) chemistry of the compositions.

Specific Application in Light Emitting Diode

Referring now to a specific particularly apparent and useful application is as the optically transmissive encapsulating material (dome or lens) of light emitting diodes or other devices where high refractive index and thermal stability are desirable. For example, in accordance with the present invention a light emitting diode is constructed similarly to the one described in U.S. Pat. No. 6,204,523 B1. An optically transmissive cover (also called a dome in the reference patent), acts as a lens for the light emitting diode and bears the reference numeral 18 in FIG. 1 of the reference patent. In accordance with the present invention, the optically transmissive cover of this light emitting diode is made of the high refractive index, thermally stable polysiloxane resin of the present invention. As noted above in the introductory section of the present application, it is desirable for a light emitting diode to have an optically transmissive cover with a refractive index of 1.56 and above. It is also desirable and somewhat lacking in the prior art for such a cover to be thermally stable and retain its optically transmissive properties for substantial time. Utilization of the polysiloxane resin of the present invention provides these advantages for light emitting diode and other applications as well.

What is claimed is:

1. A thermally stable polysiloxane composition which is a cross-linked product of a Part A composition, of a Part B composition and of a Part C composition comprising a catalyst that catalyzes the cross-linking of Part A with Part B, the Part A composition comprising a polysiloxane having 60 to 75 percent by weight phenyl groups;

the Part B composition comprising a polysiloxane having 50 to 80 percent by weight phenyl groups;

the polysiloxane composition having the properties:

(1) of optical clarity as measured by 90% or greater transmission of light of 400 nm wavelength in a 1.0 centimeter path;

(2) thermal stability in that the composition still has 90% or greater transmission of light of 400 nm wavelength in a 1.0 centimeter path after exposure to 150° C. for 6 hours, and (3) refractive index at 589 nm of 1.545 or greater, and wherein Part A is a copolymer including methylphenylvinyl-Si—$O_{1/2}$, diphenyl-Si—O, methylvinyl-Si—O and pheny-Si—$O_{3/2}$ units, and where Part B is a copolymer including dimethylHydrido-Si—$O_{1/2}$ units, diphenyl-Si—O units, phenyl-Si—$O_{3/2}$ units, and where the composition includes covalent cross-linked bonds between Part A and Part B, the cross-links having been formed between vinyl and hydride containing units.

2. A polysiloxane composition in accordance with claim 1 comprising 40 to 200 parts by weight of the Part B copolymer for each 100 parts by weight of the Part A copolymer.

3. A polysiloxane composition in accordance with claim 2 that is a gel.

4. A polysiloxane composition in accordance with claim 2 that has a Durometer Type A hardness in the range of 5 to 95.

* * * * *